UNITED STATES PATENT OFFICE.

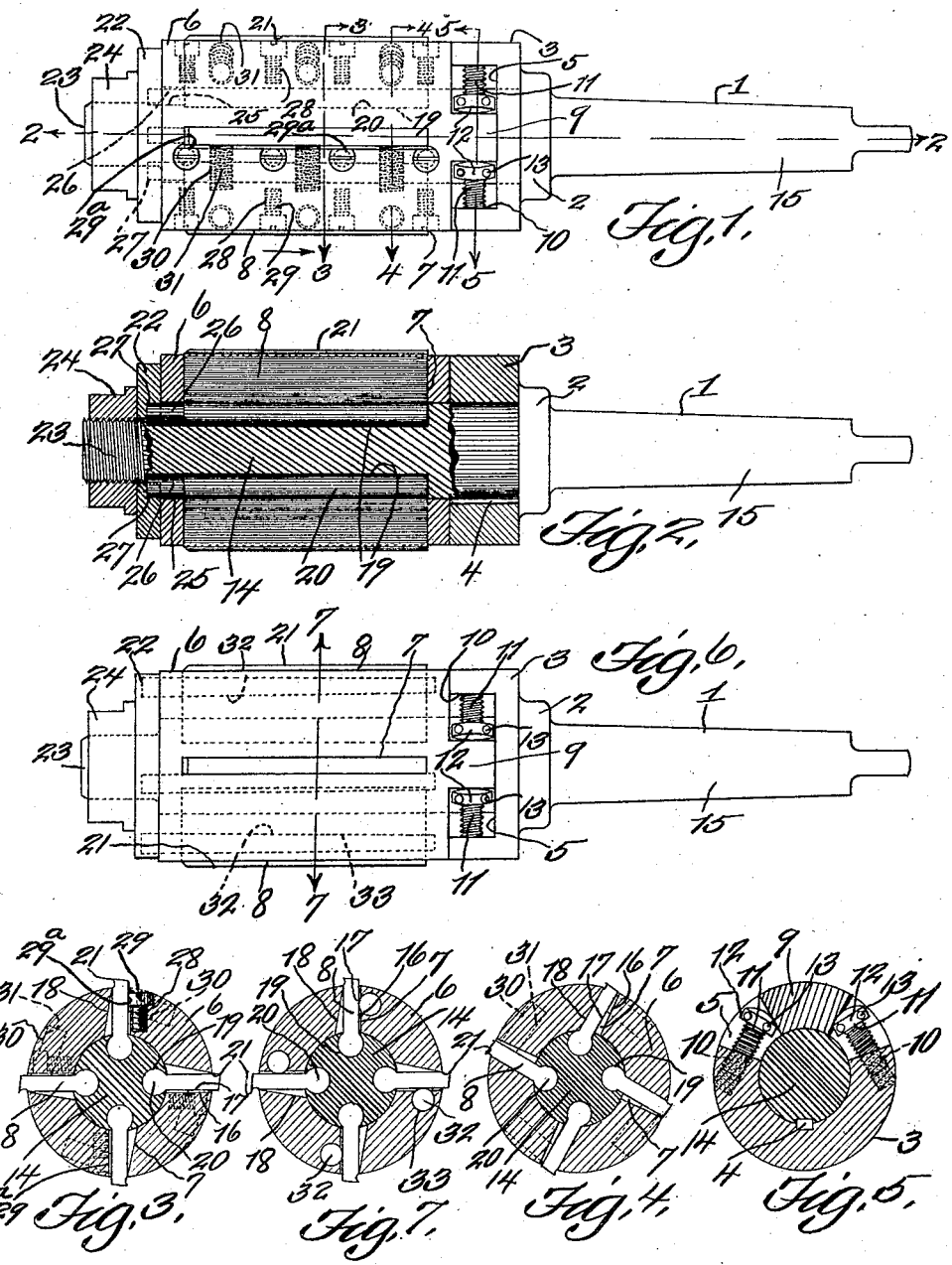

WALTHER C. RUHLANDT, OF JACKSON, MICHIGAN.

REAMER.

1,415,121.    Specification of Letters Patent.    Patented May 9, 1922.

Application filed August 12, 1920. Serial No. 402,984.

*To all whom it may concern:*

Be it known that I, WALTHER C. RUHLANDT, a citizen of the United States, residing at Jackson, in the county of Jackson and State of Michigan, have invented certain new and useful Improvements in Reamers, of which the following is a specification, reference being had to the accompanying drawings.

This invention relates to an improved reamer and an object is to provide a very simple, efficient and practical tool of this kind wherein the blades are capable of adjustment in order to increase or decrease the travel of the tool and furthermore to provide a tool capable of being cheaply made and sold at a reasonable profit.

Another object is to provide a reamer wherein the blades are adjustably mounted in a shell, in combination with an arbor on which the shell is mounted, and means in conjunction with the shell and rigidly operative with the arbor so as to adjust the shell for changing the position of the blades, in other words for extending or retracting them in order to vary the diameter of the travel of the edges of the blades.

Still another object is to provide a reamer or milling tool wherein the blades are extensible or retractible and capable of adjustments at points intermediate the minimum or maximum diameters of the travel of the cutting edges of the blades.

A further object is to provide a tool of this kind including means for locking the blades so that the tool can be used as a rigid reamer or cutter.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in elevation of the reamer or cutter constructed in accordance with the invention, Figure 2 is a sectional view on line 2—2 of Figure 1, Figure 3 is a cross sectional view on line 3—3 of Figure 1, Figure 4 is a cross sectional view on line 4—4 of Figure 1 showing the blades retracted, Figure 5 is a cross sectional view on line 5—5 of Figure 1, Figure 6 is a view in side elevation of a modified form of reamer or milling tool, Figure 7 is a cross sectional view on line 7—7 of Figure 6.

Referring to the drawings, 1 designates an arbor which is of the usual construction and adapted to engage with the chuck of a milling machine (not shown). Formed as an integral part of the arbor is a collar 2 and engaging the arbor and in contact with the integral collar 2 is a removable collar 3. However, this collar 3 is splined by means of a feather 4 on the arbor so as to prevent rotation. This collar 3 is provided with a segmental cut away portion 5.

Movably mounted upon the arbor beyond the collar 3 is a tool holding shell 6 which is provided with radial openings or slots 7 which are engaged by the blades 8. One end of the shell adjacent the collar 3 has an extension 9 which engages the segmental cut away portion of the face of the collar 3. The opposite radial walls of the segmental cut away portions 5 of the collar 3 are provided with threaded bores or recesses 10 in which the screws 11 are threaded. These screws have rounded heads 12 which are designed to bear against the opposite radial walls of the extension 9 and by using a spanner (not shown) to engage the depressions 13 of the heads of the screws 11, the screws may be adjusted, one in one direction and the other in the opposite direction.

In other words, by moving one of the screws outwardly and moving the other screw inwardly, the position of the extension 9 of the shell may be altered thereby adjusting the shell relatively to the arbor that is to say, the portion 14 thereof axially beyond the portion 15 which engages the chuck of the milling machine (not shown).

While the openings or slots 7 are arranged radially it is to be noted that they are provided with opposite walls offset differently from the center of the arbor. In other words, the wall 16 is offset from the center of the arbor and in parallelism with one wall 17 of the cutter when the blade is in the position shown in Figure 3, while the opposite wall 18 is offset from the center of the arbor at an angle to the wall 16 and at an angle to the opposite face of the blade when the blade is in the position shown in Figure 3. By this arrangement it will be noted that the blades may be retracted or extended as the case may be in order to vary the diameter of the cutting edges of the blades. The portion 14 of the arbor is provided with diametrically opposite elongated grooves 19 which are substantially cylindrical in form, and are engaged by the substantially cylindrical retaining beads or ribs or enlargements 20 of the blades. It will be noted that these grooves 19 are so constructed as to permit of a rocking movement of the blades, that is to say, when the shell is adjusted relatively to the portion 14 of the arbor in order to retract or extend the blades which have cutting edges 21. The adjustment of the shell is accomplished by adjusting the screws 11. Mounted on the portion 14 of the arbor adjacent one end of the shell is a washer 22 and engaging the threaded end 23 of the portion 14 of the arbor is a nut 24 which holds the washer 22 against the end of the shell.

As shown in Figure 2 of the drawings, the end of the shell engaged by the washer 22 is provided with openings 25 which are aligned with the grooves 19 of the portion 14 of the arbor. Engaging these openings are pins 26 which also engage the recesses 27 formed in the wall of the central opening of the washer 22. It will be noted that by adjusting the nut 24 in the direction of the washer 22, the pins 26 may be forced toward and in engagement with the ends of the substantially cylindrical enlargements 20 of the blades, thereby acting to take up the end thrust of the blades, when the parts are adjusted. It will be noted that the slots 7 particularly their outer portions are a little wider than the thickness of the blades so as to permit a rocking movement of the blades when the shell is adjusted relatively to the arbor. The shell is provided with threaded recesses or bores 28 which are positioned in parallelism with the walls 16 of the openings or slots 7 and adapted to engage these recesses or bores are headed screws 29. Ordinarily when using the reamer or milling tool so that the parts are capable of adjustments the screws 29 are dispensed with, although they may be used if desired, even though it will be noted that the tool is used as an adjustable reamer.

However, in order to make a rigid reamer or milling tool, the screws 29 may be inserted so that their heads will be engaged by certain of the faces of the blades thereby providing an abutment and at the same time acting to lock the blades in position. Also these screws serve as means to lessen the bearing surfaces for certain faces of the blades instead of permitting certain faces of the blades to lie flat against the walls 16 of the openings 7.

The shell is also provided with cavities 30 for the reception of expansion coil springs 31 which act to prevent vibration or jarring of the blade when the tool is in action.

Referring to Figures 6 and 7 it will be noted that a modified form of reamer or milling tool is provided and in this case the screws 29 and the springs 31 are dispensed with and in lieu thereof tapered elongated pins 32 are employed. These pins 32 engage correspondingly shaped grooves or openings 33 formed in the walls 16 of the slots 7 so that by adjusting the nut 24 and causing it to jam against the washer 22, the blades may be locked in position.

It will be noted that in Figures 1 and 3 the screws 29 have flat faces as indicated at 29$^a$ which when opposite the blades permit the blades to yieldably move, in other words, permit the blades to expand and contract. Furthermore the screws are adjusted so as to position the flat faces opposite the blades while adjusting the reamer and after the reamer is adjusted the screws are turned so as to cause their cylindrical portions to engage the blades and lock them in position. These screws remain at all times in the shell of the reamer and when the cylindrical portions are in engagement with the blades act to prevent or relieve vibration of the blades and furthermore lock the blades provided the user prefers it.

Furthermore owing to the slots being wider than the thickness of the blades thereby affording clearance, the flat faces when opposite the blades will permit the blades to rock.

In Figures 6 and 7 the locking pins 32 are tapered and are set in the washer 22 and furthermore the holes in the shell are also tapered. By adjusting the nut 24 tight against the washer 22 will force the pins 32 against all of the blades at the same time which makes a rapid adjustment when the device is being used as a rigid reamer. When the nut 24 is loosened and then removed, the washer may be removed, and after which the shell 6 of the reamer may be detached from the portion or spindle 14 after which the blades may be removed from the shell.

The invention having been set forth, what is claimed as new and useful is:—

1. In a reamer, an arbor, a plurality of radial blades rockably carried by the arbor and extending radially therefrom, a shell rotatably adjustable on the arbor and through which the blades engage, and means carried by the arbor and operatively connecting with the shell for adjusting the same to retract or extend the blades.

2. In a reamer, an arbor, a shell rotatably adjustable thereon, said arbor including a plurality of blades rockably connected thereto and arranged in radial formation and loosely engaging through the shell, and means for adjusting the shell partially rotatably relatively to the arbor for retracting or extending the blades.

3. In a reamer, an arbor, a shell rotatably adjustable thereon, said arbor including a plurality of blades rockably connected thereto and arranged in radial formation and loosely engaging through the shell, and means for adjusting the shell partially rotatably relatively to the arbor for retracting or extending the blades, and means for preventing vibration of the blades.

4. In a reamer, an arbor, a shell rotatably adjustable thereon, said arbor including a plurality of blades rockably connected thereto and arranged in radial formation and loosely engaging through the shell, means for adjusting the shell partially rotatably relatively to the arbor for retracting or extending the blades, means for preventing vibration of the blades, and means for locking the blades and converting the tool into a rigid reamer.

5. In a reamer, an arbor, a shell rotatably adjustable thereon, said arbor including a plurality of blades rockably connected thereto and arranged in radial formation and loosely engaging through the shell, means for adjusting the shell partially rotatably relatively to the arbor for retracting or extending the blades, and means for locking the blades thereby converting the tool into a rigid reamer.

6. In a reamer, an arbor, a shell through which the arbor rotatably extends, said shell having a plurality of slots, the inner portions of the walls of the slots being divergent in a direction toward the axial center of the reamer, blades movably connected to the arbor and engaging through the slots, whereby upon movement of the shell relatively to the arbor, the blades may be retracted or extended with relation to the periphery of the shell.

7. In a reamer, an arbor, a shell through which the arbor rotatably extends, said shell having a plurality of slots, the inner portions of the walls of the slots being divergent in a directon toward the axial center of the reamer, blades movably connected to the arbor and engaging through the slots, whereby upon movement of the shell relatively to the arbor, the blades may be retracted or extended with relation to the periphery of the shell, and means for adjusting the shell, for varying the extensibility of the blades.

In testimony whereof I hereunto affix my signature.

WALTHER C. RUHLANDT.